United States Patent
Bonnedal et al.

(10) Patent No.: US 7,587,139 B1
(45) Date of Patent: Sep. 8, 2009

(54) OPTICAL CHANNEL POWER CONTROL IN WDM NETWORKS

(75) Inventors: Dag Bonnedal, Enskede (SE); Bengt Johansson, Hagersten (SE); Stefano Piciaccia, Milan (IT); Fransisco Martinez, Oggiono (IT)

(73) Assignee: Cisco Technology, Inc., San Jose, CA (US)

( * ) Notice: Subject to any disclaimer, the term of this patent is extended or adjusted under 35 U.S.C. 154(b) by 1215 days.

(21) Appl. No.: 10/435,837

(22) Filed: May 12, 2003

(51) Int. Cl.
*H04B 10/08* (2006.01)
*H04J 14/02* (2006.01)

(52) U.S. Cl. .......................... 398/83; 398/33
(58) Field of Classification Search .................. 398/135, 398/136, 138, 139.33, 36, 39, 89, 31, 88
See application file for complete search history.

(56) References Cited

U.S. PATENT DOCUMENTS 5,680,235 A 10/1997 Johansson ................... 359/110
2003/0117696 A1* 6/2003 Goobar et al. ........... 359/337.2
2004/0051938 A1* 3/2004 Chan et al. ................ 359/337.1

FOREIGN PATENT DOCUMENTS

| WO | WO 99/21302 | 4/1999 |
|----|-------------|--------|
| WO | WO 00/02331 | 1/2000 |

* cited by examiner

*Primary Examiner*—Dalzid Singh

(57) ABSTRACT

Information about optical amplifier ASE power is propagated down a link. Each amplifier along the link can learn of the ASE power at its input and take this input ASE power into account in controlling its own per channel output power. Each amplifier can also pass along to the next amplifier an indicator that represents its output ASE power taking into account both its input ASE power and own generated ASE power. Intermediate optical add/drop multiplexers (OADMs) adjust the ASE power indicator to account for losses and the spectral characteristics of each filter.

10 Claims, 8 Drawing Sheets

OPTICAL CHANNEL POWER CONTROL IN WDM NETWORKS

BACKGROUND OF THE INVENTION

The present invention is related to optical networking and more particularly to systems and methods to support proper regulation of optical signal power levels.

Wavelength division multiplexing (WDM) techniques have been developed to increase the capacity of optical networks by combining multiple optical signals of disparate wavelengths onto the same fiber. Each wavelength constitutes an independent channel for communication. To allow optical signals including composite WDM optical signals to extend over large distance without costly recovery of the transmitted data and regeneration of the optical signals, optical amplifiers have been developed. Improvements in optical amplifier bandwidth permit large numbers of WDM wavelengths to be amplified simultaneously by a single amplifier.

Key considerations in optical link design include the placement of optical amplifiers along the link, setting the nominal amplifier gain, and adjusting amplifier power in accordance with current operating conditions. The objective is to regulate the received optical signal power and signal to noise ratio (OSNR) on each channel. Each OSNR should be sufficient for accurate recovery of transmitted data yet the optical signal power should not be so high so as to exceed the dynamic range of receiver components. Optical power levels at amplifier outputs should be sufficiently low to avoid undesirable non-linear effects. Proper receiver OSNR may be assured by specifying an appropriate per channel output power for each amplifier along the link. This output power per channel should be maintained even as the number of channels carried and link losses vary over time.

One way to assure constant output power per channel is to measure and regulate power on a per-channel basis at each amplifier. However, economic constraints mandate that the aggregate power be controlled to avoid the need to break the composite WDM signal into its wavelength components. To address variations in the number of channels, one could simply select and maintain an appropriate constant gain (output power over input power) without needing to be cognizant of the current channel count. However, this strategy would not maintain constant output power per channel in the face of variation in losses prior to the amplifier. Variations in losses can be addressed by maintaining total output power but then changes in channel count will lead to changes in output power per channel.

An optical amplifier power regulation technique has been developed to address the need to maintain per channel output power in the face of variations in channel count and link loss characteristics. In this technique, an amplifier power control processor is cognizant of the number of WDM channels being carried through the amplifier. A desired gain is calculated based on the maximum output power, current input power, and current channel count. This gain is recalculated whenever the channel count changes and the amplifier maintains this gain between updates.

It will be appreciated that this procedure requires that information on the current channel count be maintained and distributed through an optical link. It will also be appreciated that the channel count may change over the extent of a link as channels are dropped and/or added. Specific techniques for maintaining and distributing accurate channel counts for the purpose of amplifier power control are explained in International Publication No. WO 99/21302 published on Apr. 29, 1999, the contents of which are herein incorporated by reference in their entirety for all purposes.

A problem that arises in implementing this amplifier power control technique is that a portion of the power present at both the amplifier input and output results from a special kind of noise, ASE (Amplified Spontaneous Emission), rather than the WDM signal power. A given amplifier can be aware of its own ASE contribution and therefore take account of it when adjusting its gain. However, there is also ASE noise power resulting from previous amplifiers that is present at the amplifier input. This input ASE noise power is amplified and forms a part of the total amplifier output power. It is very difficult to locally measure input ASE power but failing to account for it results in an overestimate of output signal power, leading the amplifier to set its gain too low to achieve the desired per channel output power.

What is needed are systems and methods for maintaining and distributing information about ASE power in an optical link to support proper regulation of amplifier power.

SUMMARY OF THE INVENTION

By virtue of one embodiment of the present invention, information about optical amplifier ASE power is propagated down a link. Each amplifier along the link can learn of the ASE power at its input and take this input ASE power into account in controlling its own per channel output power. Each amplifier can also pass along to the next amplifier an indicator that represents its output ASE power taking into account both its input ASE power and own generated ASE power. Intermediate optical add/drop multiplexers (OADMs) adjust the ASE power indicator to account for losses and the spectral characteristics of each filter.

A first aspect of the present invention provides a method for operating a node in an optical network. The method includes: receiving an indicator of input ASE power from a previous node in line, generating an indicator of output ASE power based at least in part on the received indicator, and transmitting the indicator of output ASE power to a next node in line.

A second aspect of the present invention provides apparatus for operating in an optical network. The apparatus includes: an optical node that receives and sends optical signals in the optical network and a processor, coupled to the optical node, that receives an indicator of input ASE power from a previous node in line, generates an indicator of output ASE power based at least in part on the received indicator, and transmits the indicator of output ASE power to a next node in line.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative optical network environment, an optical link carrying a plurality of optical channels, e.g., a WDM optical link. The link may include a series of optical nodes such as optical add-drop multiplexers (OADMs), optical amplifiers, combinations of optical add-drop multiplexers and amplifiers, etc., all interconnected by optical fiber. As the term is used here, a link may be, e.g., a point-to-point link interconnecting a transmitter and a receiver with the optical nodes in between the transmitter and receiver. Alternatively, the link may have a ring configuration. The representative network environment is merely used to illustrate particular embodiments of the present invention.

Figure 1:
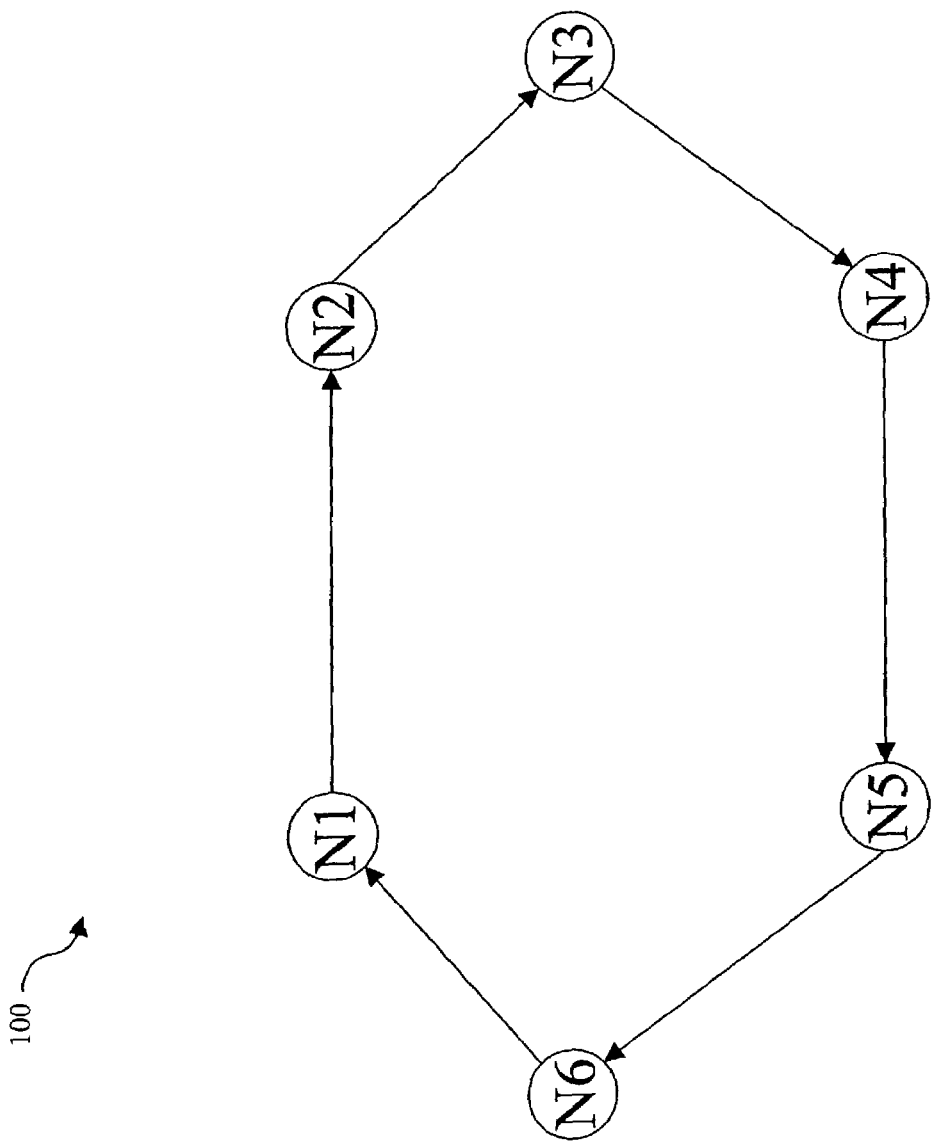
FIG. 1 depicts one type of optical network where embodiments of the present invention may be applied.

FIG. 1 depicts a representative ring network 100 in simplified form. Each node N1 through N6 may be, e.g., an optical amplifier or OADM. Light flow is depicted as being clockwise around the ring although it will be understood that ring 100 may form part of a bi-directional ring. It is assumed that ring 100 carries multiple WDM channels with the number of WDM channels varying around the ring as OADMs insert and remove channels, and as network configuration changes.

Ring 100 implements an amplifier power control scheme as will be described. The principal objective of amplifier power control is to maintain the power in each channel at a desired level in the transmission fiber and, at the receiver, at a level within the receiver dynamic range to assure error-free or nearly error-free recovery of data. To satisfy this constraint in the face of variations in channel count and losses, each amplifier computes a desired gain based on knowledge of incoming ASE spectrum and power, target channel output power and current # of channels. Between gain updates, the amplifier runs in a constant gain mode. The updates need not be very frequent since changes in channel configuration are relatively infrequent and optical losses generally vary slowly. Update frequency may vary over a very wide range. In one particular implementation, the update frequency is once every ten minutes. Updates may also be triggered by changes in channel configuration.

In support of this scheme, each node is aware of the number of channels that it receives without spectral analysis of the received signal. Channel count information is transmitted between nodes with each OADM updating the next node with information as to changes in channel count due to insertion and removal of wavelengths. The channel count information can be included in a token that is transmitted from node to node. A scheme for distributing channel count information in this fashion is described in International Pub. No. WO 99/21302, the contents of which are incorporated herein by reference in their entirety for all purposes. The tokens may be transmitted, e.g., via a particular wavelength dedicated to network management functions or on a separate data communication network to which the nodes are connected. The tokens may also be distributed via a central token server.

Figure 2:
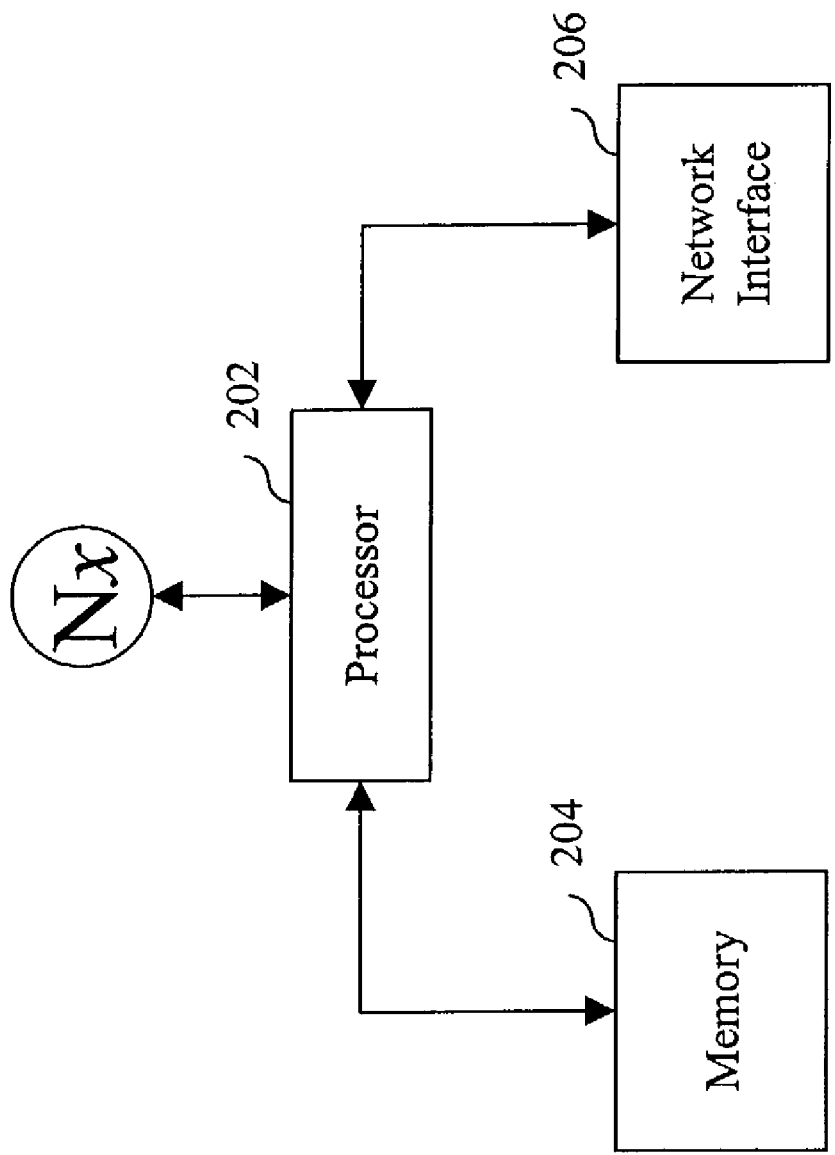
FIG. 2 depicts details of an optical node according to one embodiment of the present invention.

To support channel count information management and, in the case of amplifiers, power control, the nodes should be equipped with a certain amount of intelligence. FIG. 2 generally depicts hardware that may be associated with a representative node denoted as Nx. A processor 202 performs computations related to channel count processing, amplifier power control, and other functions described herein. Processor 202 may be, e.g., a general purpose microprocessor, ASIC or portion thereof, FPGA or portion thereof, etc.

Processor 202 may execute instructions stored on a memory device 204 which may be, e.g., a RAM, ROM, EPROM, etc. Software for implementing embodiments of the present invention may also be stored on other computer-readable storage media such as magnetic disks, optical disks, magneto-optical disks, flash memory devices. Distribution of software across a network such as the Internet may also be considered a type of computer-readable storage medium for the purpose of defining the present invention.

A network interface 206 allows for the communication of tokens with adjoining nodes according to one embodiment of the present invention. Network interface 206 may include optical and electronic hardware for the purpose of communicating tokens via a network management wavelength, or alternatively, via a separate data communication network.

Figure 3:
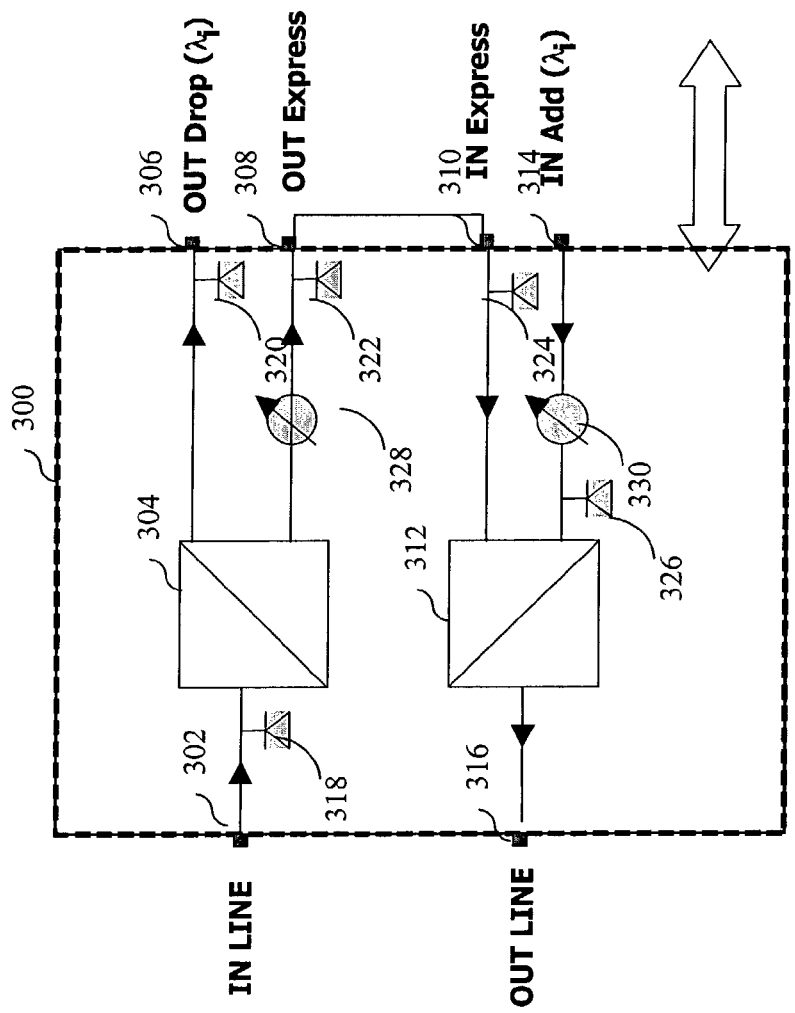
FIG. 3 depicts details of an optical add/drop multiplexer (OADM) according to one embodiment of the present invention.

FIG. 3 depicts details of a node that is an optical add-drop multiplexer OADM 300. Light flowing around the ring enters OADM 300 via an IN-LINE port 302 to encounter a drop element 304. Drop element out 304 extracts selected wavelengths to be output via a OUT-Drop port 306. These dropped wavelengths may be forwarded to a local receiver, transferred to another ring or network, etc. Wavelengths that are not dropped (also referred to as "express" wavelengths) are output via an OUT-Express port 308 and then input via an IN-Express port 310. These are shown as being connected together although the ports are accessible to allow for modular removal of either the drop or add portions.

An add element 312 combines the express wavelengths with wavelengths to be inserted into the light flow around the ring that are presented at an IN-Add port 314. The recombined WDM signal is output via an OUT-LINE port 316.

In OADM 300, a photodiode 318 measures power at IN-LINE port 302. A photodiode 320 measures power at OUT-drop port 316. A photodiode 322 measures power at OUT-Express port 308. A photodiode 324 measures power at IN-Express port 310. Both measurements are available to preserve modularity. A photodiode 326 measures the power level of the added wavelengths at the input to add element 312.

Also in OADM 300, a variable optical attenuator 328 is provided in the express path at the output of add element 312. Another variable optical attenuator 330 is located at the IN-add port 314 to allow adjustments to the power levels of the inserted wavelengths. Processor 202 has access to all of the power measurements and can set the variable optical attenuators as desired to adjust optical powers. In particular, the launched optical powers of the added channels should match the power levels of the through channels.

Figure 4:
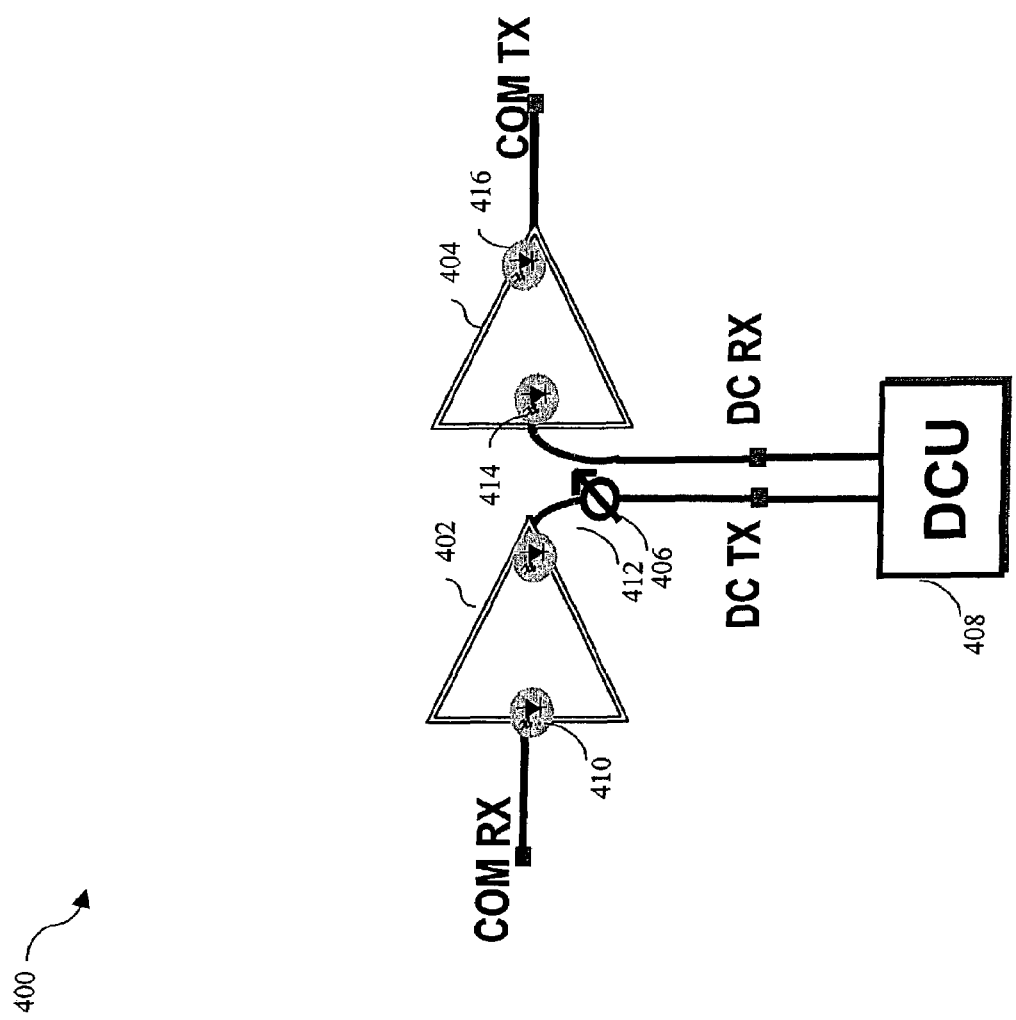
FIG. 4 depicts details of an optical amplifier module according to one embodiment of the present invention.

FIG. 4 depicts a representative implementation of an amplifier 400. Amplifier 400 is depicted as having two stages 402 and 404. The two stages are typically Erbium-doped fiber amplifiers (EDFAs) but the present invention is not limited to any particular optical amplification technology. To allow for gain control, a variable optical attenuator 406 is positioned between the stages. Alternatively, gain may also be controlled by variation of the pump power. There is also an interstage chromatic dispersion compensation unit 408 depicted although the details of dispersion compensation are not germane to the present invention.

A photodiode 410 allows for measurement of power at the amplifier input (COM-RX) while a photodiode 412 measures power at the amplifier output (COM-TX). There is also a photodiode 414 at the output of first stage 402 and a photodiode 416 at the input of second stage 404. Measured power levels are available to processor 202 which is also able to control gain via variable optical attenuator 406.

It should be noted that for both OADM 300 and amplifier 400, the positions of photodiodes and variable optical attenuators are merely representative. OADM 300 and amplifier 400 may have any structure consistent with the present invention.

The correct gain of each amplifier, i.e., the gain required to keep the power per channel close to the target (Ptarget), is obtained by calculating the corresponding total output power at the output of each amplifier (Ptot), and by adjusting the amplifier gain to match this output power. This calculation is facilitated by knowledge of the actual number of channels (Nch) passing through the amplifier: Ptot=Nch×Ptarget.

An obstacle to effective control of amplifier power level is the presence of ASE noise power in the ring. ASE noise accumulates through the amplifier chain. At some point in the ring (not shown), it is filtered out to avoid ASE circulation. For each individual amplifier, assuming flat gain, the ASE power is substantially proportional to the product of the amplifier noise figure and gain. Since the gain is set locally and the noise figure is a known parameter, each amplifier 400 is aware of its own generated ASE. In operating the power control loop, the actual output signal power (Ps) can be directly calculated by subtracting the generated ASE power (ASE) from the total output power: Ps=Ptot−ASE. However, due to the contribution of previous amplifiers, ASE power is also present in the input and the amplified input ASE power also contributes to the total amplified output power. In fact the total input ASE power may be higher than the signal power on any individual channel. If this contribution is ignored, per channel signal output power will be overestimated resulting in the gain level being set at a suboptimal level. The actual power per channel will be lower than the target power. According to one embodiment of the present invention, input ASE power may also be taken into account in amplifier power control without the need for special spectral analysis.

According to one embodiment of the present invention, the token that carries channel count information through successive nodes is augmented to also carry a parameter referred to as "relative ASE power." Generally, relative ASE power refers to the percentage of total power at a given point in the network that is due to ASE. Each node receives a relative ASE power figure from the previous node and updates that figure to take into account changes at that node. The updated relative ASE power is forwarded to the next node. The parameter is reset to zero on a linear scale by any node that lacks input power from a previous node on the ring such as a multiplexer/demultiplexer that terminates and/or originates wavelengths but does not pass any through. As will be shown, by use of the relative ASE power parameter, the amplifiers can compensate for both input and self-generated ASE power when setting gain.

Figure 5:
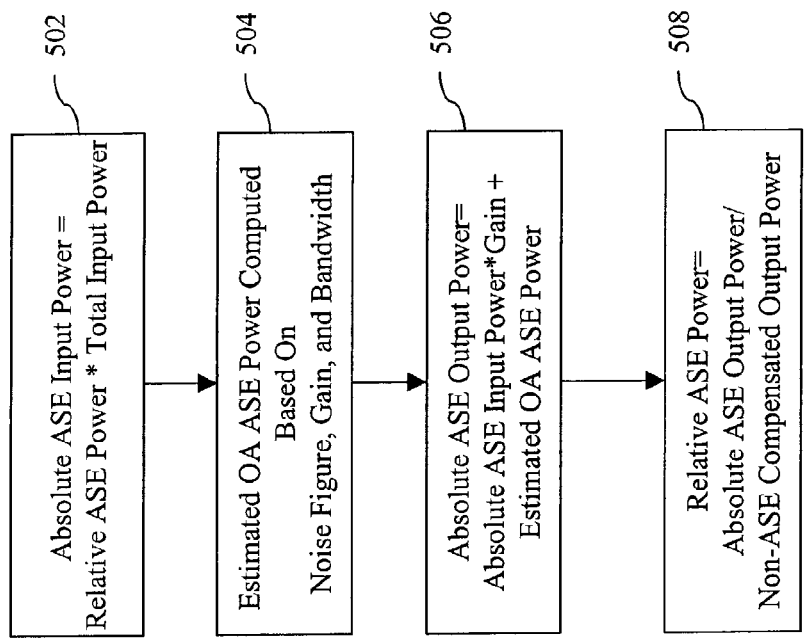
FIG. 5 is a flowchart describing steps of operating an optical amplifier according to one embodiment of the present invention.

FIG. 5 is a flowchart describing steps of operating an optical amplifier to process received relative ASE power level and generate an output relative ASE power to forward to the next node. At step 502, the absolute ASE input power is determined by multiplying the received relative ASE power by the measured total input power. At step 504, the amplifier estimates its own ASE power contribution by the expression: ASE Pwr[dBm]=−48+NF+Gain+10 log(BW[nm]) where NF is the amplifier noise figure and BW[nm] is the amplifier bandwidth in nm. It may be necessary to use an amplifier-specific lookup table to determine noise figure based on gain and input power. In certain implementations, the amplifier module itself will present a measured total output power and a calculated ASE-compensated output power. In that case, the amplifier ASE power contribution can be obtained subtracting ASE-compensated output power from the total measured output power.

At step 506, the absolute ASE power is determined by summing the amplifier's own contributions with the input: absolute ASE output power equals absolute ASE input power multiplied by gain, plus the amplifier's own ASE power contribution. At step 508, the output relative ASE output power is determined by dividing absolute ASE output power by the total output power.

The amplifier's own gain control can now take advantage of its knowledge of the absolute ASE output power. Per channel output power is determined by subtracting absolute ASE output power from non-ASE compensated output power and dividing the result by the number of channels. The control loop can then adjust the amplifier gain to bring per channel output power to a desired nominal level. This gain will remain constant until the next update of channel count and relative ASE power.

Figure 6:
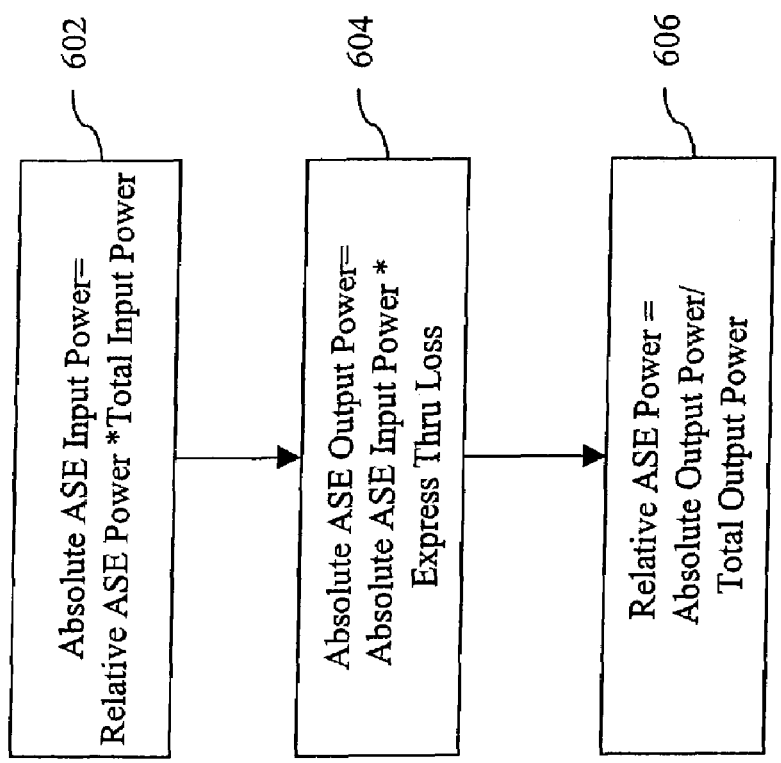
FIG. 6 is a flowchart describing steps of operating an OADM according to one embodiment of the present invention.

FIG. 6 is a flowchart describing steps of operating an OADM to process received relative ASE power level and generate an output relative ASE power level for forwarding to the next node. At step 602, an absolute ASE input power is measured by multiplying the received relative ASE power by the measured total input power. At step 604, an absolute ASE output power is calculated by multiplying the absolute ASE input power found at step 602 by the known through loss on the express path through the OADM. A step 606 determines the output relative ASE power by dividing the absolute ASE output power found at step 604 by the measured total output power.

Figure 7:
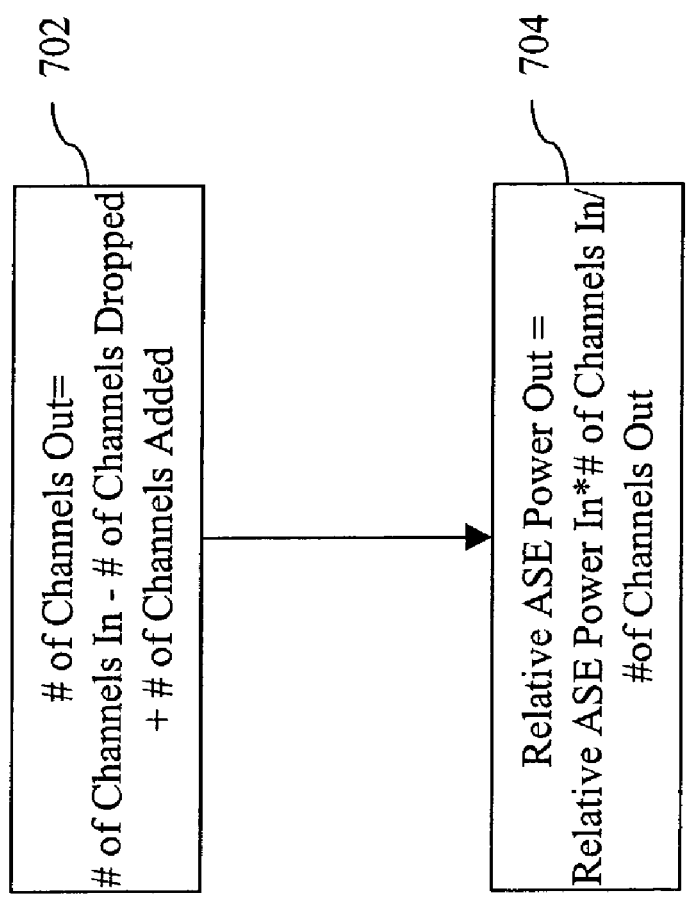
FIG. 7 is a flowchart describing steps of operating an OADM that does not include power measurement capability according to one embodiment of the present invention.

In certain OADM implementations there is no capability of measuring total signal power in the express path. FIG. 7 is a flowchart describing steps of an alternative method of operating an OADM in this case. At step 702, channel count is updated. The new channel count is obtained by adding the received channel count figure to the number of inserted channels and subtracting the number of dropped channels. At step 704, the output relative ASE power is obtained by multiplying the received relative ASE power by the received channel count and then dividing by the transmitted channel count.

The ASE compensation scheme that has just been described provides a substantial improvement in estimating per channel power output. However, as OADMs drop and add channels, ASE noise is filtered and the overall effect is a reduction in total accumulated ASE power along the line. Thus, the above-described method will tend to overestimate ASE leading to an underestimate of current signal power per channel and excessive gain. Accordingly, the optical receivers will experience adequate but excessive per channel power, especially when channel counts are low.

A further improvement in accuracy of per channel power control can be obtained by considering ASE power on a per-subband basis. The portion of the amplifier gain spectrum where the transmission channels are found is divided into subbands, preferably of equal spectral width. These subbands may correspond to, e.g., subbands of a system channel plan, the spacing of individual channels, etc. One could also use even finer granularity and have subbands that encompass guard bands between transmission channels. Subbands are also included outside the spectral range occupied by the transmission channels to take into account the ASE contributions there. The widths of these subbands are scaled so as to have equivalent noise bandwidths to those inside the transmission channel range.

The per-subband technique can then be understood as a modification of the procedure described in reference to FIGS. 4-7. Each node receives, potentially modifies, and transmits to the next node a relative ASE power for each subband rather than for the band as a whole. When an OADM or another node filters out light in a particular subband, that subband's relative ASE power is set to zero. In computing the modified relative ASE power to be passed to the next node, the amplifier ASE contribution is scaled by the width of the subband relative to total ASE noise bandwidth of the amplifier. The total ASE power at the output is computed as the sum of the ASE power in the subbands. This total ASE power is then used to determine total signal power per channel.

Figure 8:
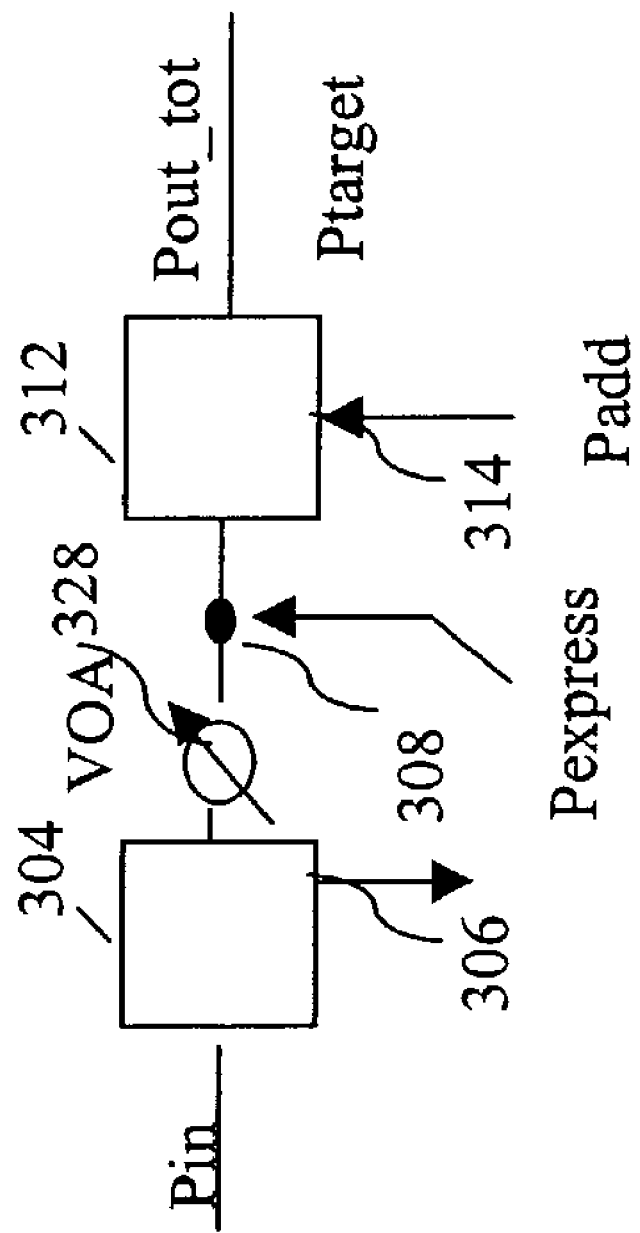
FIG. 8 depicts elements of a power control scheme according to one embodiment of the present invention.

FIG. 8 illustrates how power may be controlled based on the above-described ASE power calculations. FIG. 8 shows elements of FIG. 3 that constitute the express path including drop element 304, VOA 328, OUT-Express port 308 (and thus implicitly IN-Express port 310), and drop element 312. Although IN-Add port 314 is shown, VOA 324 is omitted for simplicity of illustration. Also, all power monitors are also omitted for simplicity of illustration.

The power of the express channels is regulated by adjustment of VOA 328 in accordance with the following equality:
$$P_{express} = P_{ase\_in} - Loss\ Express - VOA + P_{express\_target} \times N_{ch\_express}$$

Where:
Pexpress=Total power measured at either OUT-Express port 308 or IN-Express port 310

Pexpress_target=Per channel target power

VOA=adjustable loss of VOA 328. This is the parameter that is varied to force equality.

Loss Express=Fixed loss of drop element 304.

Nch_express=Number of channels that pass through drop element 304.

This power control loop takes into account loss variations due to age and temperature in addition to ASE and variations in the number of channels. Another power control loop should adjust the power of the add channels to match the express channels. This power control loop takes into account loss variations due to aging and temperature. The power of the add channels is matched to that of the drop channels by use of VOA 324. Both VOA 324 and 328 should have sufficient range to accommodate variations over the service life of the system. Power control of all channels may also occur within an amplifier 400 by operation of VOA 406.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. In an optical network, a method for operating a node comprising an optical add/drop multiplexer (OADM) in said network, said method comprising:
    receiving at the node an indicator of input ASE power comprising an estimate of total input ASE power over total input power from a previous node in line;
    generating an indicator of output ASE power comprising an estimate of total output ASE power over total output power, wherein said generating comprises:
        measuring total input power;
        estimating absolute ASE input power by multiplying said indicator of input ASE power by total input power;
        estimating absolute output power by multiplying absolute ASE input power by loss associated with said OADM for channels that pass through the OADM; and
        estimating said indicator of output ASE power by dividing absolute ASE output power by total output power; and
    transmitting said indicator of output ASE power to a next node in line.

2. The method of claim 1 wherein said indicators of input ASE power and output ASE power are determined over an entire transmission spectrum for said network.

3. The method of claim 1 wherein said indicators of input ASE power and output ASE power are determined over a subband of a transmission spectrum for said network.

4. The method of claim 1 wherein said network comprises a ring.

5. The method of claim 1 wherein said network comprises a point-to-point link.

6. An apparatus comprising:
    an optical node comprising an optical add/drop multiplexer (OADM), wherein the optical node is configured to receive and send optical signals in an optical network; and
    a processor, coupled to said optical node, wherein the processor is configured to:
        receive an indicator of input ASE power comprising an estimate of total input ASE power over total input power from a previous node in line;
        measure total input power;
        estimate absolute ASE input power by multiplying said indicator of input ASE power by total input power;
        estimate absolute output power by multiplying absolute ASE input power by loss associated with said OADM for channels that pass through the OADM;
        estimate an indicator of output ASE power comprising an estimate of total output ASE power over total output power by dividing absolute ASE output power by total output power; and
        transmit said indicator of output ASE power to a next node in line.

7. The apparatus of claim 6 wherein said indicators of input ASE power and output ASE power are determined over an entire transmission spectrum for said network.

8. The apparatus of claim 6 wherein said indicators of input ASE power and output ASE power are determined over a subband of a transmission spectrum for said network.

9. The apparatus of claim 6 wherein said optical node is configured to receive and send optical signals in said optical network that is in the form of a ring.

10. The apparatus of claim 6 wherein said optical node is configured to receive and send optical signals in said optical network that is in the form of a point-to-point link.

* * * * *